United States Patent [19]
Yuch

[11] Patent Number: 5,172,860
[45] Date of Patent: Dec. 22, 1992

[54] SHOWER HEAD WITH A TEMPERATURE MEASURING FUNCTION

[76] Inventor: Fan C. Yuch, 3F, No. 2, Alley 2, Lane 88, Sec. 2, Shui Yuan Rd., Hsi-Chih, Taipei, Taiwan

[21] Appl. No.: 687,954

[22] Filed: Apr. 19, 1991

[51] Int. Cl.⁵ ............................................. G01K 13/02
[52] U.S. Cl. ...................................... 239/71; 239/211; 374/147
[58] Field of Search ................ 239/71, 74, 211, 553.5, 239/562; 374/147, 148

[56] References Cited

U.S. PATENT DOCUMENTS

| | | | |
|---|---|---|---|
| D. 146,308 | 2/1947 | Harman | 374/147 X |
| 2,112,648 | 3/1938 | Brown | 374/147 X |
| 2,489,684 | 11/1949 | Stewart et al. | 374/147 |
| 2,579,150 | 12/1951 | Leopold et al. | 239/71 |
| 4,030,360 | 6/1977 | Fortune | 374/147 |
| 4,161,881 | 7/1979 | Raz | 374/147 |

FOREIGN PATENT DOCUMENTS

| | | | |
|---|---|---|---|
| 339363 | 11/1989 | European Pat. Off. | 239/71 |
| 3834560 | 4/1990 | Fed. Rep. of Germany | 239/71 |
| 2458062 | 1/1981 | France | 239/71 |

Primary Examiner—Andres Kashnikow
Assistant Examiner—Lesley D. Morris
Attorney, Agent, or Firm—Bacon & Thomas

[57] ABSTRACT

A shower head having a temperature-measuring function and a figurative appearance, including a water tunnel and a water-discharging switch located at a bent portion of the water tunnel for controlling the water flow whereby the shower head can provide babies with joys in bathing, a water temperature-measuring device being disposed in a longitudinal slant groove formed on the front face of the shower head, a safety glass being disposed on the slant groove for protecting the water temperature-measuring device so that the water temperature-measuring device can measure both temperatures of water in the water tunnel and outside the shower head to ensure the bathing safety and avoid any scalding accident.

4 Claims, 3 Drawing Sheets

SHOWER HEAD WITH A TEMPERATURE MEASURING FUNCTION

BACKGROUND OF THE INVENTION

The present invention relates to a shower head with a temperature-measuring function and a figurative appearance, wherein a thermometer and a water-discharging switch are disposed to ensure safety and enhance the convenience in use.

A conventional shower head for bathing is primarily composed of a handle connected with a water pipe and a water outlet located at the end of the handle. With respect to the appearance of such shower head, the shape thereof is monotonous and without attraction. As to the usage thereof, the water flow of the shower head is controlled by the faucet and therefore, when bathing an infant or baby and the water flow must be cut off immediately in consideration of too high water temperature, it is frequently difficult to reach the faucet and close the same while handling the infant or baby at the same time. As a result, a scalding accident might happen. In addition, when bathing an infant, the temperature of the water must be appropriate. However, the temperature of water is often adjusted via the hot and cold water faucets and measured by hand. In such a manner, the temperature can not be properly adjusted and measured and thus a scalding accident might take place.

SUMMARY OF THE INVENTION

It is therefore an object of this invention to provide a shower head designed with a cartoon appearance and suitable for holding by a hand. Such a shower head can increase the joy when taking a shower or bath. Particularly, when bathing an infant or small baby, such a shower head can comfort and attract the infant or baby. Moreover, the shower head is provided with a water-discharging switch for directly controlling the water flow so that in case of an emergency, the water flow can be immediately cut off.

It is a further object of this invention to provide the above shower head which is formed with a longitudinal slant groove on its front side. A thermometer is received in the slant groove for measuring the temperature of the water in and outside the shower head. The user can read the temperature on the thermometer and avoid any scalding accident when bathing an infant or baby according to the read temperature. In addition, a safety glass is fitted on the slant groove to protect the thermometer without altering the temperature-measuring effect.

It is still a further object of this invention to provide the above shower head wherein the temperature of water can be directly read via the thermometer when using the shower head to take a shower; on the other hand, when a bath tub is used to reserve water for bathing, the shower head can be first placed into the reserved water so that the thermometer can instantly measure and display the temperature of water in the tub. As a result, the user does not need to measure the water temperature by hand and consequently, the user's safety can be further ensured.

The present invention can be best understood through the following description and accompanying drawings.

DETAILED DESCRIPTION OF THE PREFERRED EMBODIMENT

Figure 1:
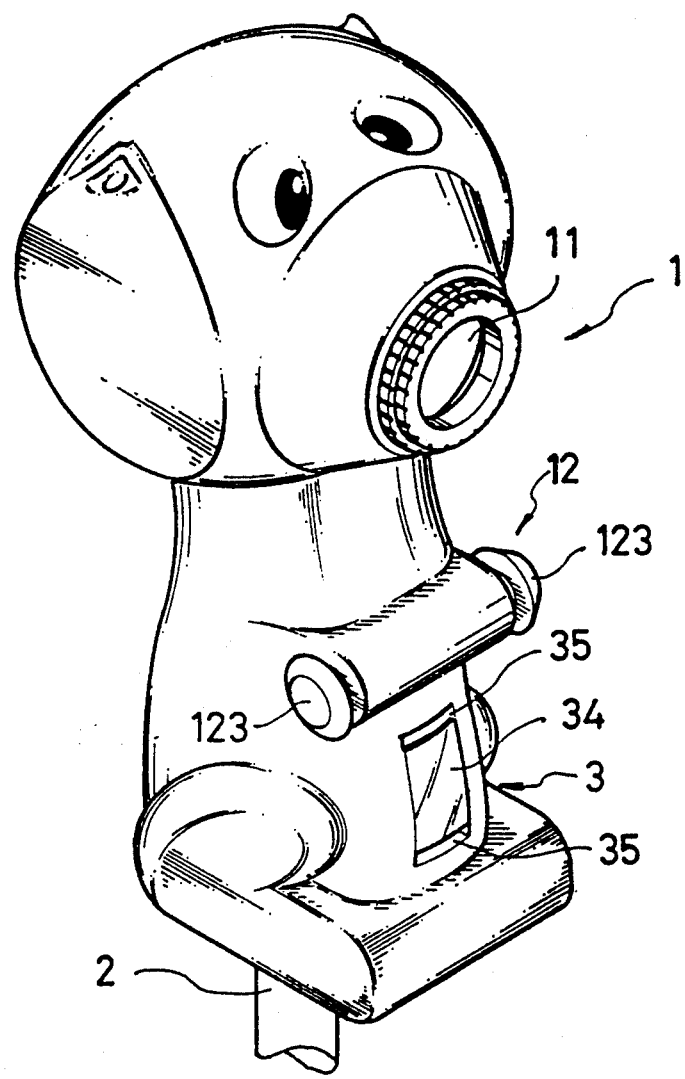
FIG. 1 is a perspective view of the shower head according to this invention.

Referring to FIG. 1, the present invention is designed with an aesthetically appealing appearance such as a cartoon pattern. The shower head 1 of this invention is shaped like a handle for the convenience of holding. The shower head 1 includes a water outlet 11 and a water-discharging switch 12 located in a place suitable for direct engagement by the user's finger. In addition, a connector 13 (see FIGS. 2-4) is disposed at the bottom of the shower head 1 for connecting with a water pipe 2 extending from a faucet (not shown).

Figure 2:
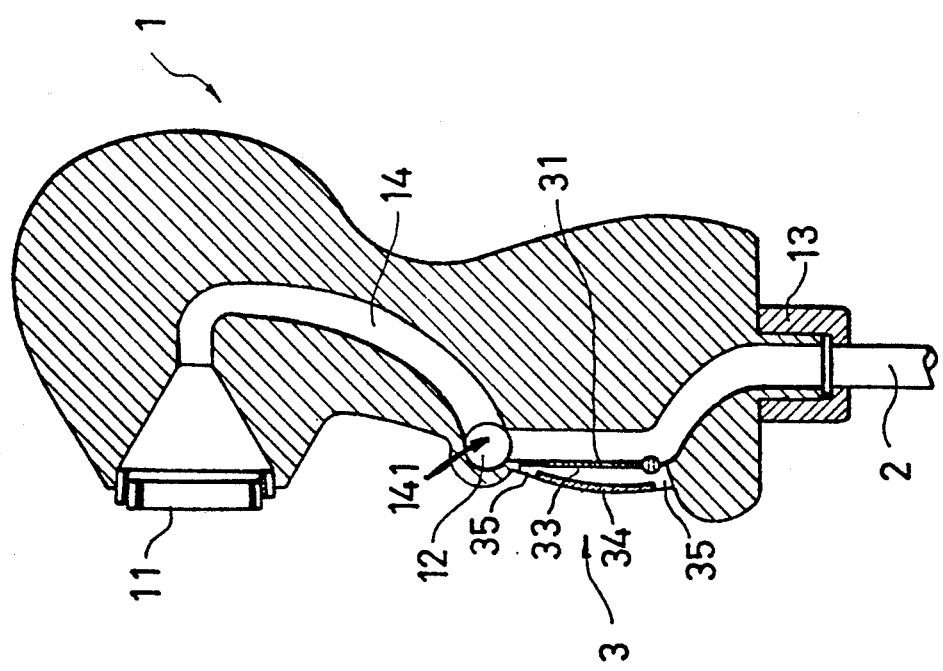
FIG. 2 is a side sectional view thereof.

Further referring to FIGS. 1 and 2, the shower head 1 is designed with an inner water tunnel 14 which extends upwards from the bottom of the shower head 1 through the front side thereof toward the water outlet 11. The water tunnel 14 is formed with a bent portion 141 at which the water-discharging switch 12 is located for controlling the discharging of water. On the front face of the shower head 1 is disposed a water temperature displaying device 3 for showing the temperature of the water in or outside the water tunnel 14.

Figure 3:
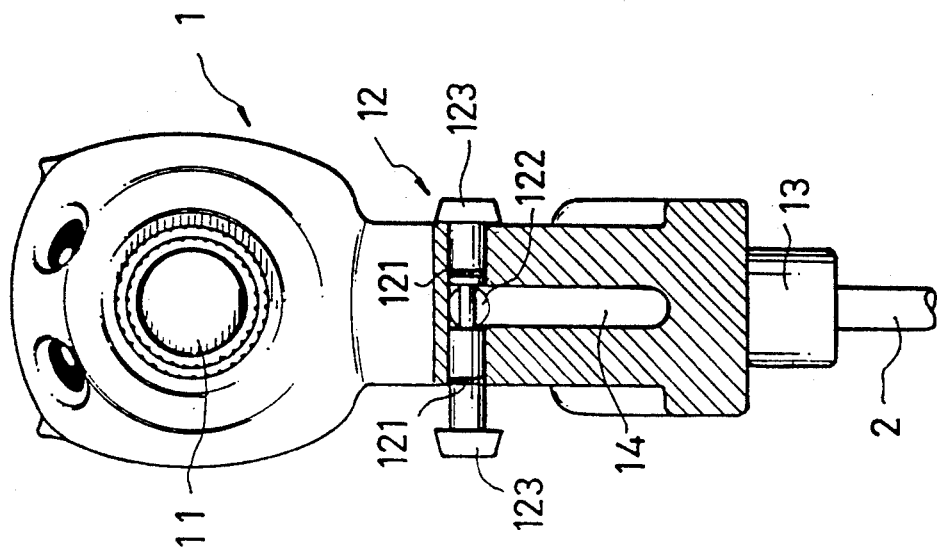
FIG. 3 is a front sectional view thereof, showing the first operating state of the shower head.
Figure 4:
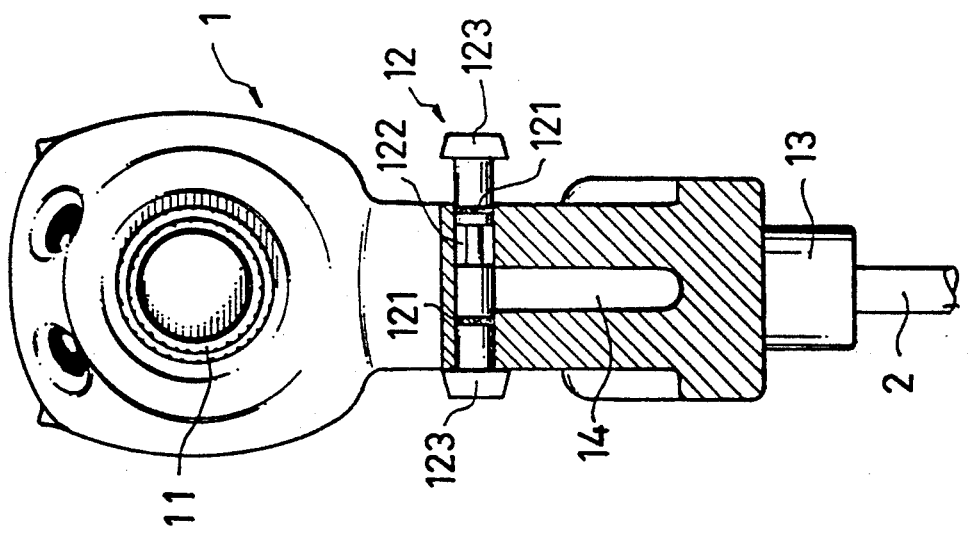
FIG. 4 is a view according to FIG. 3, showing the second operating state thereof.

Please now refer to FIGS. 3 and 4 which shows the water-discharging switch 12, wherein the switch 12 constitutes a circular rod type spool valve and is disposed across the water tunnel 14 and two leak-resistant O-rings 121 are fitted to the switch 12 on two sides of the tunnel 14 for ensuring a water tight seal at the switch 12. The switch 12 is formed with a bore hole 122 on its one side and two ends of the switch 12 protrude beyond the shower head 1 to form two pushing portions 123 for the finger to easily push left and right. When the pushing portion 123 is pushed left, as shown in FIG. 3, the bore hole 122 is aligned with the water tunnel 14 to form an open state, permitting the shower head 1 to discharge water. Reversely, when the pushing portion 123 is pushed right, the bore hole 122 is separated from the tunnel 14 to close the same so as to cut off the water flow, as shown in FIG. 4.

According to the above arrangement, when taking a shower, the user does not need to control the water flow via the faucet and can control the water flow directly through the switch 12 of the shower head 1. Therefore, the water flow can be easily cut off, especially in an emergency.

Figure 5:
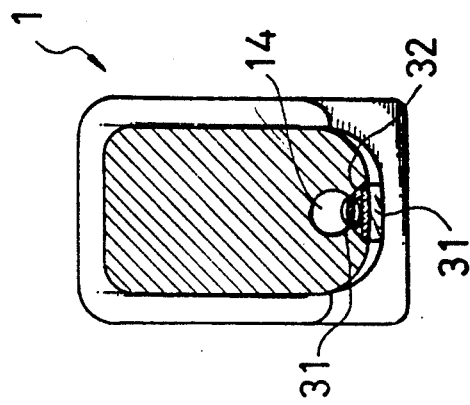
FIG. 5 is a top sectional view of the shower head according to this invention.

Please now refer to FIGS. 1 and 5. The water temperature displaying device 3 of this invention is composed of a thermometer 31 located on the front face of the shower head 1 adjacent to the water tunnel 14. Therefore, the thermometer 31 can measure temperatures of water both in the tunnel 14 and outside the shower head 1. The thermometer 31 is disposed in a longitudinal slant groove 32 formed on the front face of the shower head 1. Scales 33 are disposed on two sides of the groove 32 for reading the temperature, also see FIG. 2. The thermometer 31 is received by the groove 32 and is protected by the same from being hit and cracked. A piece of safety glass 34 can be additionally fixed on the slant groove 32 for further ensuring the safety of the thermometer 31. Moreover, for preventing the safety glass 34 from influencing the temperature measuring effect of the thermometer 31, between the slant groove 32 and the safety glass 34 are formed two openings 35 respectively located at the upper and lower portions of the slant groove 32 so that the thermometer 31 can communicate with the external environment. Therefore, when using the shower head 1 to take a shower, the temperature of water in the tunnel 14 can be easily read via the displaying device 3 and, when a bath tub is used to reserve water for bathing, the shower head 1 can be first placed into the reserved water so that the water can go through the openings 35 to contact the thermometer 31 and the temperature of water can be instantly read via the displaying device 3. As a consequence, the temperature of the reserved water can be properly controlled to avoid any scalding accident.

The present invention can be variously embodied and many modifications can be made without departing from the scope of this invention.

What is claimed is:

1. A shower head with a temperature measuring function comprising:
   a shower head body including an upper portion, a lower portion and a front face, said lower portion including a water inlet and said upper portion including a water outlet, a water tunnel extending within said shower head body to interconnect said water inlet to said water outlet, said water tunnel including a bent section such that at least a portion of said tunnel extends within said shower head body adjacent said front face;
   a manually operable switch valve means carried by said shower head body and extending into said tunnel, said switch valve means being movable between a first operating position in which said switch valve means fluidly interconnects said water inlet to said water outlet and a second operating position in which the flow of water from said water inlet to said water outlet is prevented; and
   water temperature measuring and displaying means secured to said shower head body between said water inlet and said switch valve means adjacent said front face at said bent portion, said water temperature measuring and displaying means functioning to measure the temperature of water either flowing through said tunnel or within a basin of water contacted by the front face of said shower head body and displaying the measured temperature through said front face.

2. A shower head with a temperature measuring function as claimed in claim 1, wherein said switch valve means comprises a sliding spool valve having first and second manually engageable pushing portions extending outside said shower head body for shifting said valve between said first and second operating positions.

3. A shower head with a temperature measuring function as claimed in claim 1, further including a groove formed in the front face of said shower head body, said temperature measuring and displaying means comprising a thermometer disposed in said groove.

4. A shower head with a temperature measuring function as claimed in claim 3, further including a piece of safety glass fixed to said groove in front of said thermometer and at least one opening formed between said safety glass and said groove to enable water contacting said front face to enter said groove.

* * * * *